(12) United States Patent
Furukawa et al.

(10) Patent No.: US 8,720,851 B2
(45) Date of Patent: May 13, 2014

(54) VALVE APPARATUS

(75) Inventors: Akira Furukawa, Kariya (JP); Ryo Sano, Kariya (JP); Kazushi Sasaki, Obu (JP); Yuusuke Niwa, Anjo (JP)

(73) Assignee: Denso Corporation, Kariya (JP)

(*) Notice: Subject to any disclaimer, the term of this patent is extended or adjusted under 35 U.S.C. 154(b) by 288 days.

(21) Appl. No.: 13/430,951

(22) Filed: Mar. 27, 2012

(65) Prior Publication Data

US 2012/0248353 A1 Oct. 4, 2012

(30) Foreign Application Priority Data

Mar. 28, 2011 (JP) .................................. 2011-70475

(51) Int. Cl.
*F02M 25/07* (2006.01)
(52) U.S. Cl.
USPC ............ 251/129.04; 251/129.12; 251/129.13; 123/568.16; 123/568.24
(58) Field of Classification Search
CPC ... F16K 31/043; F16K 31/046; F16K 1/2261; F02M 25/0756; F02M 25/0773; F02D 41/0077
USPC .......................... 251/129.04, 129.11–129.13; 123/568.16, 568.22–568.24
See application file for complete search history.

(56) References Cited

U.S. PATENT DOCUMENTS

| | | | | |
|---|---|---|---|---|
| 5,488,938 | A * | 2/1996 | Ohuchi | 123/568.16 |
| 6,467,469 | B2 * | 10/2002 | Yang et al. | 123/568.16 |
| 6,973,916 | B2 * | 12/2005 | Wayama | 123/399 |
| 7,168,682 | B2 * | 1/2007 | Nanba et al. | 251/305 |
| 7,234,444 | B2 * | 6/2007 | Nanba et al. | 251/306 |
| 7,540,278 | B2 * | 6/2009 | Nanba | 123/568.24 |
| 7,637,245 | B2 * | 12/2009 | Katsuno et al. | 251/129.04 |
| 7,669,581 | B2 | 3/2010 | Sasaki | |
| 7,866,306 | B2 * | 1/2011 | Ohata et al. | 123/568.22 |
| 7,950,623 | B2 | 5/2011 | Sasaki et al. | |
| 8,150,601 | B2 * | 4/2012 | Kawamura et al. | 123/568.24 |
| 8,459,607 | B2 * | 6/2013 | Sasaki et al. | 251/129.04 |
| 2007/0240690 | A1 | 10/2007 | Nanba | |

FOREIGN PATENT DOCUMENTS

| | | |
|---|---|---|
| JP | 11-082276 | 3/1999 |
| JP | 2007-285123 | 11/2007 |
| JP | 2009-74415 | 4/2009 |

OTHER PUBLICATIONS

Office Action (1 page) dated Feb. 26, 2013, issued in corresponding Japanese Application No. 2011-070475 and English translation (2 pages).
Office Action (6 pages) dated Dec. 23, 2013, issued in corresponding Chinese Application No. 201210085477.5 and English translation (5 pages).

* cited by examiner

*Primary Examiner* — Eric Keasel
(74) *Attorney, Agent, or Firm* — Nixon & Vanderhye PC

(57) ABSTRACT

When a valve body is rotated toward a full-close position in a valve-close mode, a control portion controls an electric motor so that the rotating speed of the valve body is lower than that in a valve-open mode. A rotating speed of the valve body around the shaft in the valve-close mode is lower than that in the valve-open mode. Thus, when the seal ring is brought into contact with the inner wall surface, an impact generated therebetween can be moderated. While the valve body is rotated toward the full-close position, a seal ring is gradually elastically deformed. A sliding friction between the seal ring and the inner wall surface can be reduced.

4 Claims, 11 Drawing Sheets

FIG. 3A FULL-CLOSE 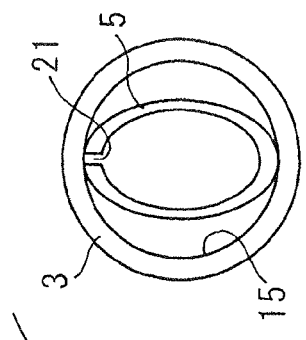 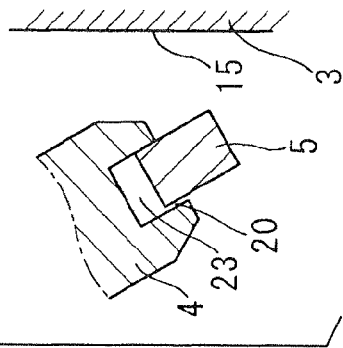
FIG. 3B 1-BAP 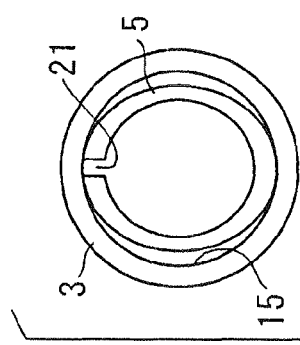 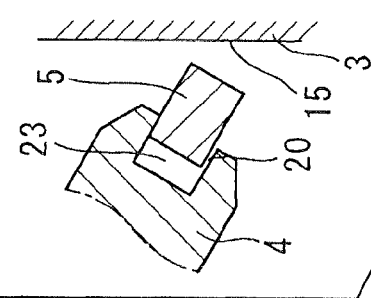
FIG. 3C 2-BAP 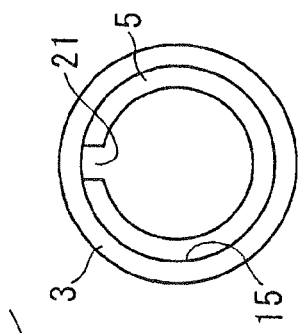 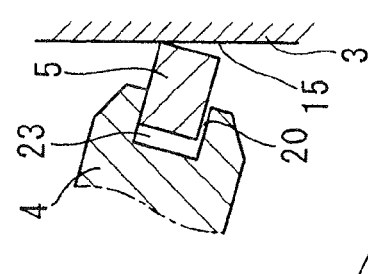
FIG. 3D FULL-OPEN 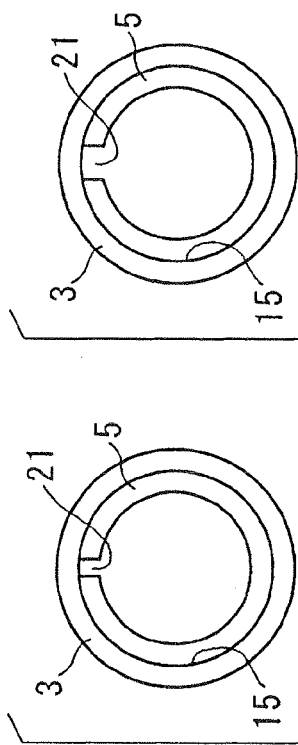 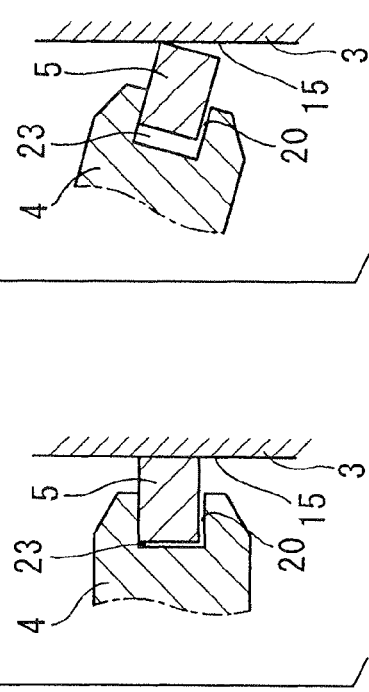

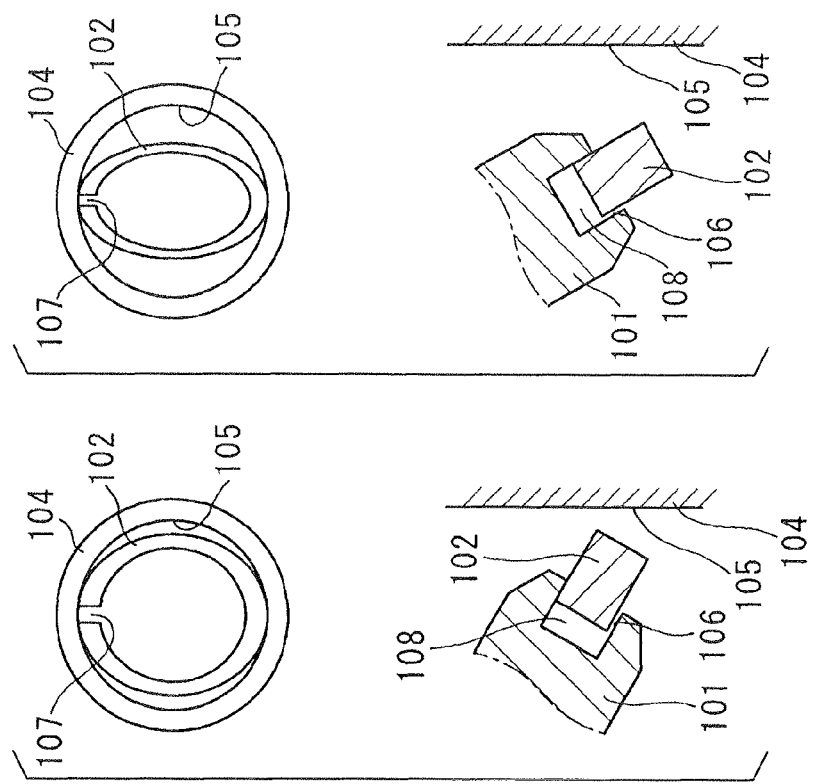
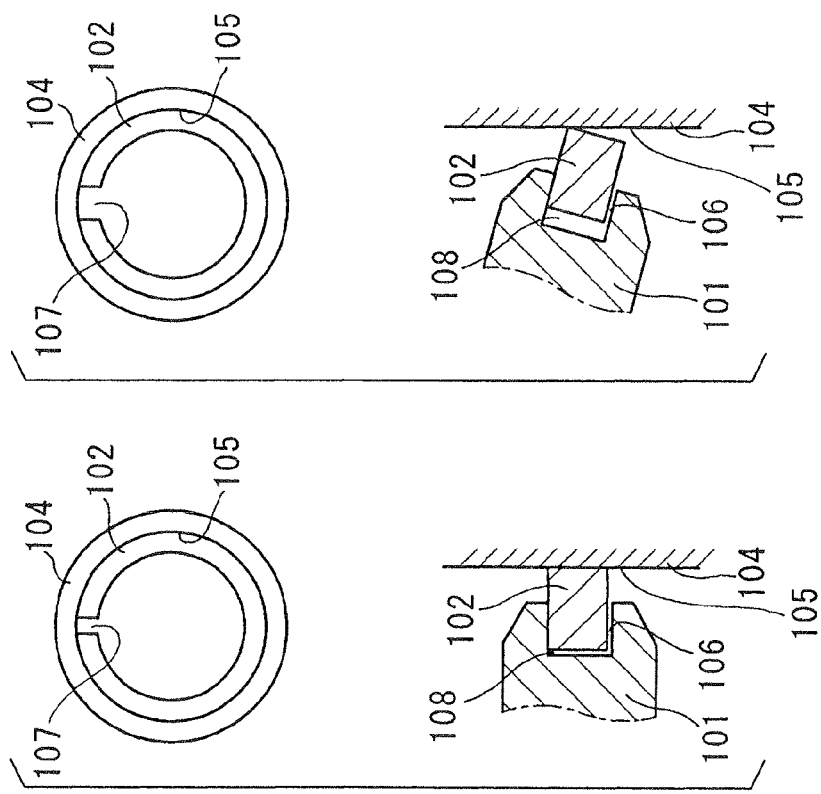

VALVE APPARATUS

CROSS-REFERENCE TO RELATED APPLICATION

This application is based on Japanese Patent Application No. 2011-70475 filed on Mar. 28, 2011, the disclosure of which is incorporated herein by reference.

TECHNICAL FIELD

The present disclosure relates to a valve apparatus of which valve body is provided with a seal ring on its outer periphery.

BACKGROUND

As shown in FIGS. 14A and 14B, a conventional valve apparatus 100 has a valve body 101 which is provided with a seal ring 102 on its outer periphery. This valve apparatus 100 is employed as an EGR-valve apparatus, for example, which varies a quantity of exhaust gas recirculating from an exhaust passage to an intake passage of an internal combustion engine.

The valve apparatus 100 is comprised of a valve nozzle 104 defining a fluid passage 103 therein, a plate-shaped valve body 101 rotatably accommodated in the valve nozzle 104 to vary a fluid passage area of the fluid passage 103, and the seal ring 102 provided on an outer periphery of the valve body 101.

The seal ring 102 seals a clearance gap between the outer periphery of the valve body 101 and an inner wall surface 105 of the fluid passage 103. As shown in FIGS. 15A and 15B, the seal ring 102 is C-shaped and is engaged with an annular groove 106 formed on the outer periphery of the valve body 101 (refer to JP-2007-285311A, for example). The C-shaped seal ring 102 forms an arc clearance 107 between its both ends and forms an annular clearance 108 in cooperation with a bottom surface of the annular groove 106. While forming the above clearances 107, 108, the seal ring 102 is rotated along with the valve body 101.

When the valve body 101 fully closes the fluid passage 103, the seal ring 102 is brought into contact with the inner wall surface 105 and is elastically deformed so that the above clearances 107, 108 are shrunk. At this moment, the seal ring 102 is in contact with the inner wall surface 105 by its tension and is brought into contact with a side wall surface 109 of the annular groove 106 by an exhaust gas pressure.

When the valve body 101 is rotated from a full-close position to a full-open position, a condition of the seal ring 102 varies as shown in FIGS. 16A to 16D.

Specifically, when the valve body 101 starts to rotate around its axis from the full-close position (FIG. 16A), the clearances 107, 108 start to expand. For a specified time period, the seal ring 102 is kept in contact with the inner wall surface 105. Then, when the valve body 101 is rotated to a first boundary angle position (1-BAP), an outer surface of the seal ring 102 is partially apart from the inner wall surface 105, as shown in FIG. 16B.

When the valve body 101 is further rotated from the first boundary angle position toward the full-open position, the tension of the seal ring 102 is decreased and the clearances 107, 108 expand. Then, the valve body 101 is rotated to a second boundary angle position (2-BAP) in which the seal ring 102 has no tension and freely moves in the groove 106, as shown in FIG. 16C.

After that, the valve body 101 is rotated to the full-open position while a free condition of the seal ring 102 is maintained, as shown in FIG. 16D.

When the valve body 101 is rotated from a position where the seal ring 102 is in the free condition toward the full-close position, the seal ring 102 is brought into contact with the inner wall surface 105 with the clearances 107, 108 expanded. Then, the seal ring 102 is elastically deformed in such a manner that the clearances 107, 108 are shrunk.

This forcible contact between the seal ring 102 and the inner wall surface 105 increases abrasions at the contacting portions therebetween. Furthermore, after the seal ring 102 is brought into contact with the inner wall surface 105, the seal ring 102 keeps sliding on the inner wall surface 105 with tension increasing, whereby the abrasions are further increased.

SUMMARY

It is an object of the present disclosure to provide a valve apparatus which is capable of restricting an abrasion at a contacting portion between a seal ring of a valve body and an inner wall surface of a fluid passage when and after the valve body closes the fluid passage.

According to the present disclosure, a valve apparatus includes: a disc-shaped valve body rotatably accommodated in a fluid passage for adjusting a flow passage area of the fluid passage; and a seal ring received in an annular groove formed on an outer periphery of the valve body. The seal ring is annularly brought into contact with an inner wall surface of the fluid passage to seal a clearance gap between the outer periphery of the valve body and the inner wall surface when the valve body is positioned at a full-close position. The valve apparatus further includes a control portion controlling an energization of an electric motor which supplies a rotational torque to the valve body so that a position of the valve body is controlled.

The control portion controls the valve body in a valve-close mode or a valve-open mode. In the valve-close mode, the control portion controls the electric motor so that the valve body is rotated toward a full-close position. In the valve-open mode, the control portion controls the electric motor so that the valve body is rotated toward a full-open position. Further, a rotating speed of the valve body in the valve-close mode is controlled lower than that in the valve-open mode.

Thereby, the rotating speed of the valve body around the shaft in the valve-close mode is lower than that in the valve-open mode. Thus, when the seal ring is brought into contact with the inner wall surface, an impact generated therebetween can be moderated. While the valve body is rotated toward the full-close position, the seal ring is gradually elastically shrunk. Thus, a sliding friction between the seal ring and the inner wall surface can be reduced. The abrasion therebetween is also reduced.

The rotating speed of the valve body represents a variation in angle position of the valve body per unit time (radian/sec).

BRIEF DESCRIPTION OF THE DRAWINGS

The above and other objects, features and advantages of the present disclosure will become more apparent from the following detailed description made with reference to the accompanying drawings. In the drawings:

FIG. 3A is a chart showing a contacting portion at a full-close position according to the first embodiment;

FIG. 3B is a chart showing a contacting portion at a first boundary angle position according to the first embodiment;

FIG. 3C is a chart showing a contacting portion at a second boundary angle position according to the first embodiment;

FIG. 3D is a chart showing a contacting portion at a full-open position according to the first embodiment;

FIG. 16A is a chart showing a contacting portion at a full-close position in a conventional valve apparatus;

FIG. 16B is a chart showing a contacting portion at a first boundary angle position in the conventional valve apparatus;

FIG. 16C is a chart showing a contacting portion at a second boundary angle position in the conventional valve apparatus; and FIG. 16D is a chart showing a contacting portion at a full-open position in a conventional valve apparatus.

DETAILED DESCRIPTION

First Embodiment

Configuration of First Embodiment

Figure 1A:
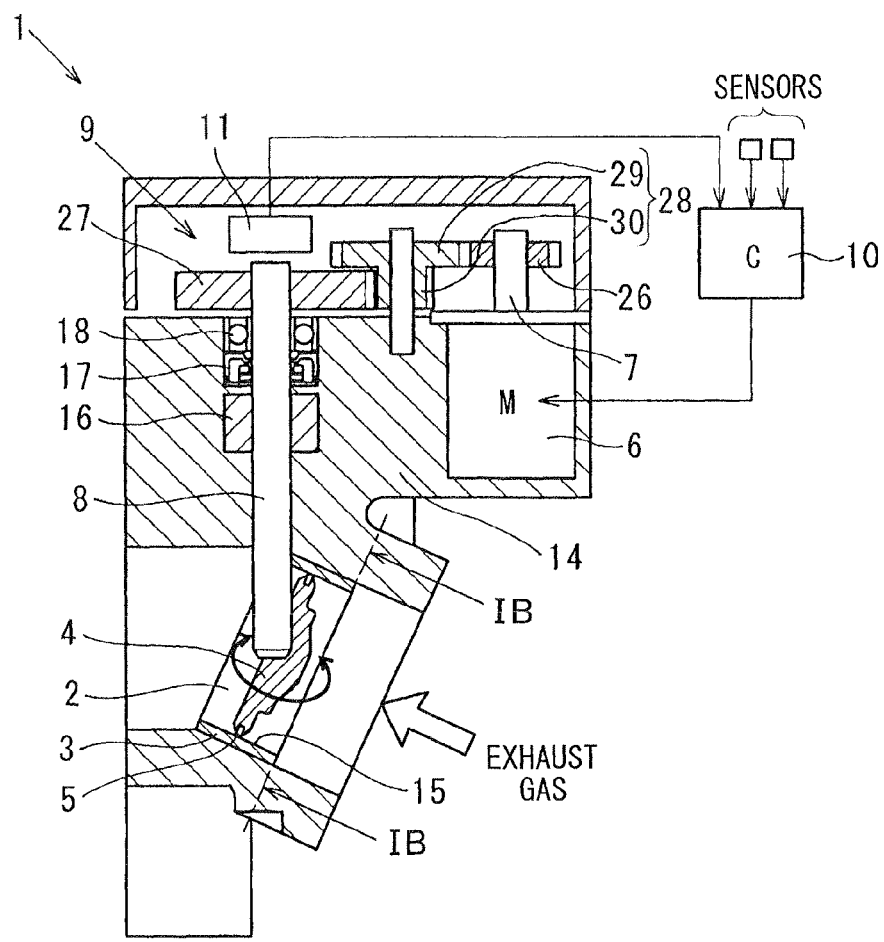
FIG. 1A is a cross sectional view of a valve apparatus according to a first embodiment.
Figure 1B:
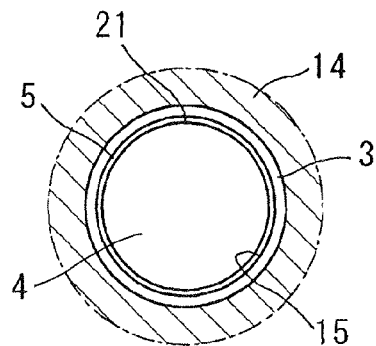
FIG. 1B is a cross sectional view taken along a line IB-IB of FIG. 1A.

Referring to FIGS. 1 and 2, a configuration of a valve apparatus 1 will be described hereinafter. The valve apparatus 1 is comprised of a valve nozzle 3 defining a fluid passage 2 therein, a plate-shaped valve body 4 rotatably accommodated in the valve nozzle 3 to vary a fluid passage area of the fluid passage 2, a seal ring 5 provided on an outer periphery of the valve body 4, an electric motor 6 generating a rotation torque for the valve body 4, a reduction gear mechanism 9 reducing the rotation torque and transmitting the reduced torque from an output shaft 7 of the electric motor 6 to a shaft 8 the valve body 4, a control portion 10 controlling the electric motor 6 and the valve body 4, and an angle sensor 11 detecting a rotational angle position of the valve body 4.

This valve apparatus 1 is employed as an EGR-valve apparatus which varies a quantity of exhaust gas recirculating from an exhaust passage to an intake passage of an internal combustion engine.

The valve nozzle 3 forms a part of fluid passage 2 for recirculating a part of exhaust gas. The valve body 4 is disposed in the fluid passage 2. The valve nozzle 3 is formed independently from a housing 14 of the valve apparatus 1. The valve nozzle 3 is made from stainless steel, for example.

The valve body 4 is a disc-shaped butterfly valve. The shaft 8 is mechanically connected to the valve body 4 in such a manner that the shaft 8 is inclined relative to a valve body 4. The valve body 4 is rotated around the shaft 8 between a full-close position and a full-open position to vary a fluid passage area of the fluid passage 2.

The full-close position represents a valve body position in which a clearance between the valve body 4 and an inner wall surface 15 of the fluid passage 2 is minimum value. If the valve body 4 has no seal ring 5 on its outer periphery, the quantity of exhaust gas flowing through the fluid passage 2 becomes minimum value. The full-open position represents a valve body position in which the quantity of exhaust gas flowing through the fluid passage 2 becomes maximum value.

The valve body 4 is also made from stainless steel. The shaft 8 is rotatably supported by the housing 14 through a metal bearing 16, an oil seal 17 and a ball bearing 18.

Figure 2A:
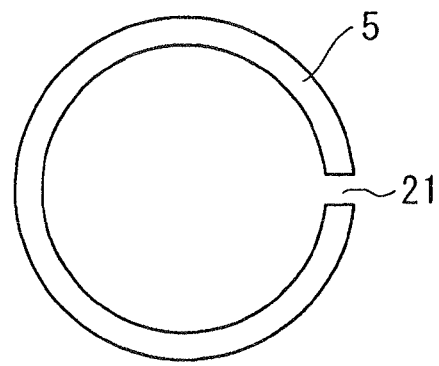
FIG. 2A is a plan view of a seal ring according to the first embodiment.
Figure 2B:
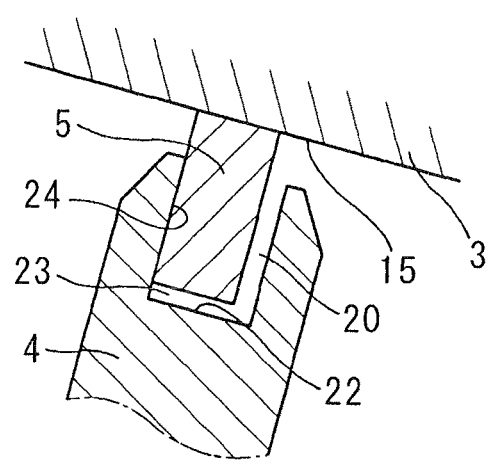
FIG. 2B is an enlarged view showing a contacting portion between a seal ring and an inner wall surface according to the first embodiment.

The seal ring 5 seals a clearance gap between the outer periphery of the valve body 4 and an inner wall surface 15 of the fluid passage 2. As shown in FIGS. 2A and 2B, the seal ring 5 is C-shaped and is engaged with an annular groove 20 formed on the outer periphery of the valve body 4. The C-shaped seal ring 5 forms an arc clearance 21 between its both ends and forms an annular clearance 23 in cooperation with a bottom surface 22 of the annular groove 20. While forming the above clearances 21, 22, the seal ring 5 is rotated along with the valve body 4.

When the valve body 4 fully closes the fluid passage 2, the seal ring 5 is brought into contact with the inner wall surface 15 and is deformed so that the above clearances 21, 23 are shrunk. At this moment, the seal ring 5 is in contact with the inner wall surface 15 by its tension and is brought into contact with a side wall surface 24 of the annular groove 20 by an exhaust gas pressure. The seal ring 5 is also made from stainless steel.

The electric motor 6 is a well-known brushless DC motor. The reduction gear mechanism 9 is comprised of a small gear 26 connected to an output shaft 7 of the motor 6, a large gear 27 connected to the shaft 8 of the valve body 4 and a middle gear 28 engaged with the small gear 26 and the large gear 27. The middle gear 28 includes a large diameter gear portion 29 engaged with the small gear 26 and a small diameter gear portion 30 engaged with the large gear 27. The large diameter gear portion 29 and the small diameter gear portion 30 are formed coaxially.

The control portion 10 includes a well-known microcomputer comprised of a CPU, a memory, an input circuit, and an output circuit. According to detection signals from the angle sensor 11 and other sensors, the control portion 10 controls the valve body 4 so that the fluid passage area of the fluid passage 2 agrees with a target value.

That is, the control portion 10 computes a target position of the valve body 4 according to an engine driving condition and controls an energization of the motor 6 so that a current position of the valve body 4 agrees with the computed target position.

The angle sensor 11 has a well-known configuration. Specifically, the angle sensor 11 is comprised of permanent magnets and a Hall IC.

When the valve body 4 is rotated from a full-close position to a full-open position, a condition of the seal ring 5 varies as shown in FIGS. 3A to 3D.

Specifically, when the valve body 4 starts to rotate from the full-close position in an opening direction, the clearances 21, 23 start to expand. For a specified time period, the seal ring 5 is kept in contact with the inner wall surface 15. Then, when the valve body 4 is rotated up to a first boundary angle position (1-BAP), an outer surface of the seal ring 5 is partially apart from the inner wall surface 15, as shown in FIG. 3B.

When the valve body 4 is further rotated from the first boundary angle position (1-BAP) toward the full-open position, the tension of the seal ring 5 is decreased and the clearances 21, 23 expand. Then, the valve body 4 is rotated up to a second boundary angle position (2-BAP) in which the seal ring 5 has no tension and freely moves in the groove 20.

After that, the valve body 4 is rotated to the full-open position while maintaining a free condition of the seal ring 5.

Figure 4:
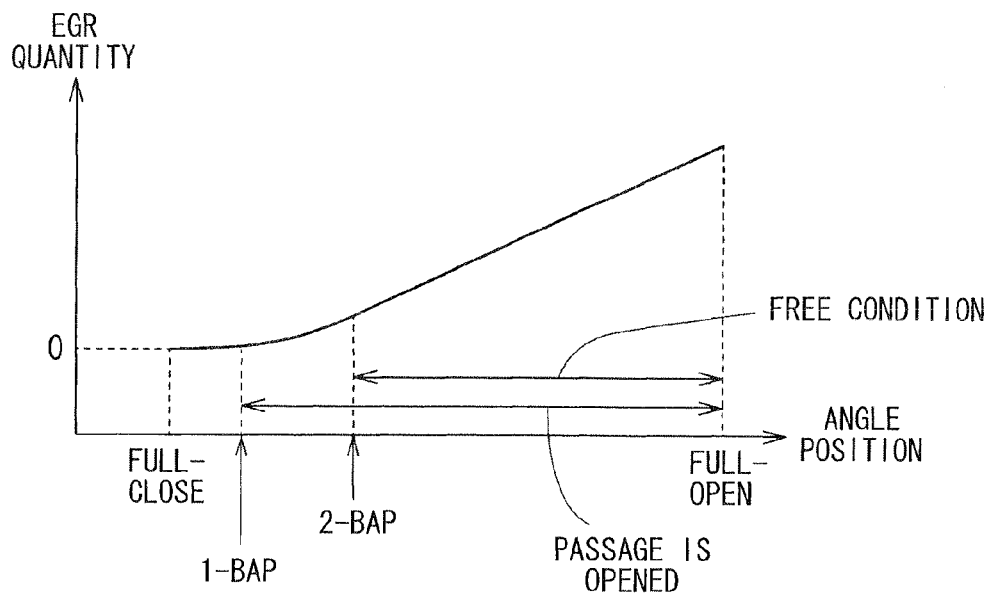
FIG. 4 is a chart showing a relationship between an angle position of a valve body and an exhaust gas recirculation quantity (EGR quantity) according to the first embodiment.

FIG. 4 shows a relationship between a rotational angle position of the valve body 4 and a quantity of recirculating exhaust gas (EGR quantity). That is, while the valve body 4 is positioned between the full-close position and the 1-BAP, the EGR quantity is substantially zero. After the valve body 4 passes the 1-BAP, the EGR quantity is increased along with the angle position of the valve body 4.

When the valve body 4 is rotated from a position where the seal ring 5 is in the free condition toward the full-close position, the seal ring 5 is brought into contact with the inner wall surface 15 with the expanded clearances 21, 23. Then, the seal ring 5 is elastically deformed in such a manner that the clearances 21, 23 are shrunk.

The control portion 10 controls the valve body 4 in a valve-close mode or a valve-open mode. In the valve-close mode, the control portion 10 controls the electric motor 6 so that the valve body 4 is rotated toward a full-close position. In the valve-open mode, the control portion 10 controls the electric motor 6 so that the valve body 4 is rotated toward a full-open position. It should be noted that a rotating speed of the valve body 4 in the valve-close mode is controlled lower than that in the valve-open mode.

That is, the control portion 10 establishes a duty ratio of electricity supplied to the electric motor 6 in such a manner that the duty ratio in the valve-close mode is smaller that that in the valve-open mode. Thereby, the rotating speed of the valve body 4 around the shaft 8 in the valve-close mode is lower than that in the valve-open mode.

Figure 5:
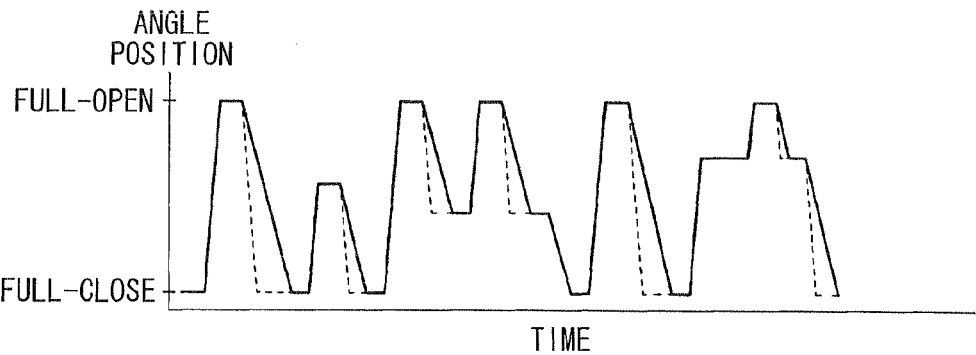
FIG. 5 is a time chart showing a variation in valve angle position according to the first embodiment.

An absolute value of a variation in opening degree of the valve body 4 in the valve-close mode is smaller than that in the valve-open mode. The valve body 4 is rotated toward the full-close position at a speed lower than a speed at which the valve body 4 is rotated toward the full-open position. In FIG. 5, a solid line represents a variation in a position of the valve body 4 in a case that the duty ratio in the valve-close mode is set smaller that that in the valve-open mode. A dashed line represents a variation in a position of the valve body 4 in a case that the duty ratio in the valve-close mode is equal to that in the valve-open mode.

Advantages of First Embodiment

The control portion 10 controls the valve body 4 in a valve-close mode or a valve-open mode. In the valve-close mode, the control portion 10 controls the electric motor 6 so that the valve body 4 is rotated toward a full-close position. In the valve-open mode, the control portion 10 controls the electric motor 6 so that the valve body 4 is rotated toward a full-open position. The rotating speed of the valve body 4 in the valve-close mode is controlled lower than that in the valve-open mode.

Thus, when the seal ring 5 is brought into contact with the inner wall surface 15, an impact generated therebetween can be moderated. While the valve body 4 is rotated toward the full-close position, the seal ring 5 is gradually deformed in such a manner that the clearances 21, 23 are gradually shrunk. A sliding friction between the seal ring 5 and the inner wall surface 15 can be reduced. The abrasion therebetween is also reduced.

Second Embodiment

When the valve body 4 is positioned between a specified threshold angle position (THAP) and the full-close position in the valve-close mode, the control portion 10 controls the electric motor 6 so that the rotating speed of the valve body 4 is lower than that in the valve-open mode. That is, until the valve body 4 is rotated up to the threshold angle position (THAP) in the valve close mode, the rotating speed of the valve body 4 is the same as that in the valve open mode. After the valve body is rotated to the threshold angle position (THAP), the duty ratio applied to the electric motor 6 is made smaller.

Figure 6:
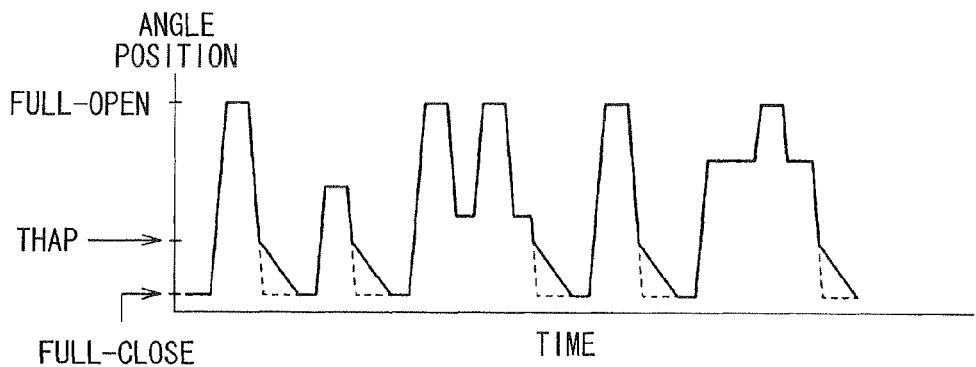
FIG. 6 is a time chart showing a variation in valve angle position according to a second embodiment.

When the valve body 4 is rotated up to the threshold angle position (THAP) in the valve close mode, the rotating speed of the valve body 4 is made smaller than that in the valve open mode. As shown in FIG. 6, when the valve body 4 is rotated over the threshold angle position (THAP) in the valve-close mode, an absolute value of a temporal variation in opening degree of the valve body 4 is smaller than ever. The valve body 4 is rotated toward the full-close position at a lower speed.

The threshold angle position (THAP) is defined between the 1-BAP and the 2-BAP and has a specified angle width. This specified angle width is established based on a variation in stop-position of the valve body 4, a detection error of the angle sensor 11 and an A/D converting error of the control portion 10.

Advantages of Second Embodiment

When the valve body 4 is positioned between the specified threshold angle position (THAP) and the full-close position in the valve-close mode, the control portion 10 controls the electric motor 6 so that the rotating speed of the valve body 4 is lower than that in the valve-open mode. Before the seal ring 5 is brought into contact with the inner wall surface 15 in the valve-close mode, the rotating speed of the valve body 4 can be reduced enough.

Thus, an abrasion between the seal ring 5 and the inner wall surface 15 can be restricted. Until the valve body 4 is rotated up to the specified threshold angle position (THAP) in the valve-close mode, the valve body 4 is rotated at the same speed as that in the valve-open mode. Thus, the valve body 4 is rotated to the full-close position faster than the first embodiment.

As described above, the threshold angle position (THAP) has the specified angle width which is established based on the variation in stop-position of the valve body 4, the detection error of the angle sensor 11 and the A/D converting error of the control portion 10. Thus, the threshold angle position (THAP) can be properly defined.

Third Embodiment

Figure 7A:
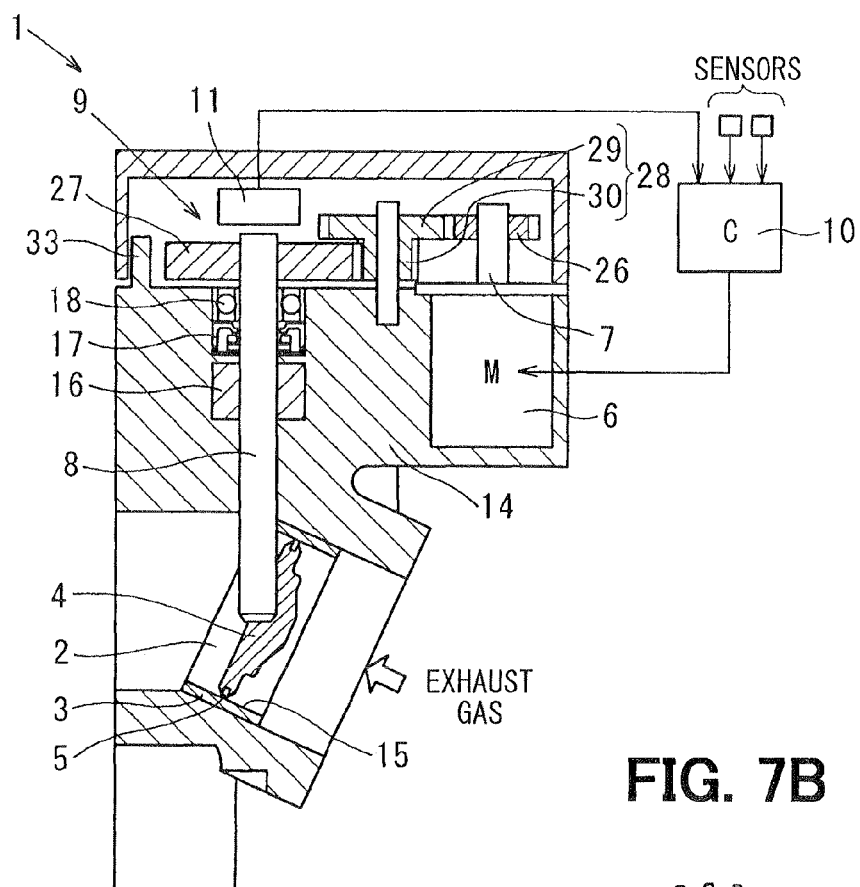
FIG. 7A is a cross sectional view of a valve apparatus according to a third embodiment.
Figure 7B:
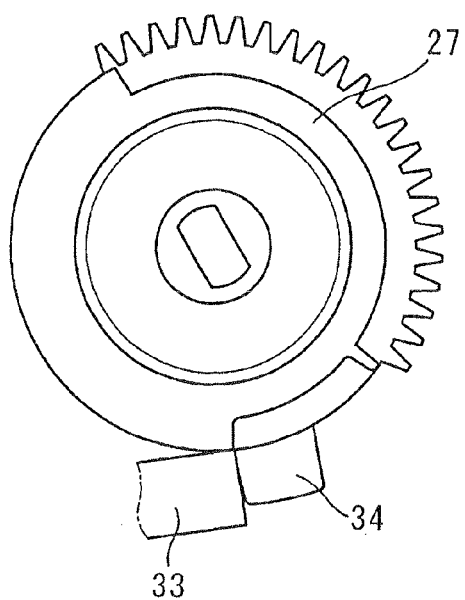
FIG. 7B is a chart showing an engaging part between a large gear and a stopper according to the third embodiment.

As shown in FIGS. 7A and 7B, the housing 14 has a stopper 33 and the larger gear 27 has a protrusion 34. The protrusion 34 can be engaged with the stopper 33. When the protrusion 34 is brought into contact with the stopper 33, the valve body 4 is restricted to rotate over the full-stop position.

When the valve body 4 is positioned between the specified threshold angle position (THAP) and the full-close position in the valve-close mode, the control portion 10 controls the electric motor 6 so that the rotating speed of the valve body 4 is lower than that in the valve-open mode. The specified threshold angle position (THAP) is established by adding a specified angle width to the full-close position. That is, until the valve body 4 is rotated up to the threshold angle position (THAP) in the valve close mode, the rotating speed of the valve body 4 is the same as that in the valve open mode. After the valve body is rotated to the threshold angle position (THAP), the duty ratio applied to the electric motor 6 is made smaller.

When the valve body 4 is rotated up to the threshold angle position (THAP) in the valve close mode, the rotating speed of the valve body 4 is made smaller than that in the valve open mode.

Figure 8:
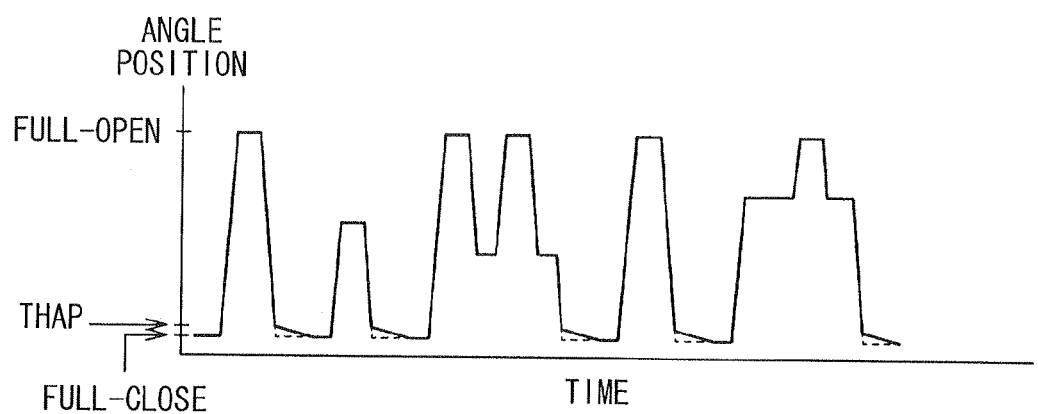
FIG. 8 is a time chart showing a variation in valve angle position according to the third embodiment.

As shown in FIG. 8, when the valve body 4 is rotated over the threshold angle position (THAP) in the valve-close mode, an absolute value of a temporal variation in opening degree of the valve body 4 is smaller than ever. The valve body 4 is rotated toward the full-close position at a lower speed. The specified angle width added to the full-close position is established based on a variation in stop-position of the valve body 4, a detection error of the angle sensor 11 and a A/D converting error of the control portion 10.

Advantages of Third Embodiment

The housing 14 has the stopper 33 and the larger gear 27 has the protrusion 34. When the valve body 4 is positioned between the specified threshold angle position (THAP) and the full-close position in the valve-close mode, the control portion 10 controls the electric motor 6 so that the rotating speed of the valve body 4 is lower than that in the valve-open mode.

Thus, before the protrusion 34 is brought into contact with the stopper 33, the rotating speed of the valve body 4 can be reduced. A collision impact between the protrusion 34 and the stopper 33 can be moderated.

Further, the threshold angle position (THAP) can be properly defined.

When the protrusion 34 collides with the stopper 33, some impacts are generated in engaging portions of the reduction gear mechanism 9. In the present embodiment, since the rotating speed of the valve body 4 is reduced before the protrusion 34 collides with the stopper 33, such impacts generated in the engaging portions can be moderated.

Fourth Embodiment

Figure 9A:
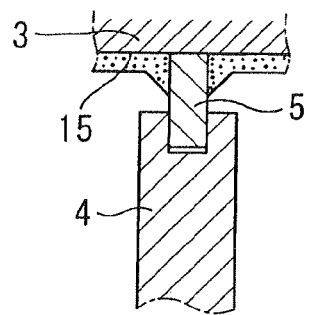
FIGS. 9A, 9B and 9C are charts showing a contacting portion between a seal ring and an inner wall surface for explaining a deposit removing process, according to a fourth embodiment.
Figure 9B:
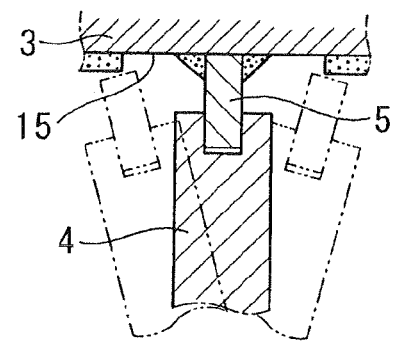
Figure 9C:
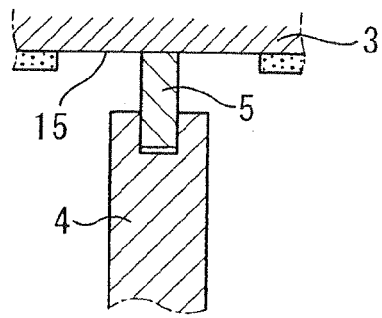

As shown in FIGS. 9A to 9C, the control portion 10 has a function of a deposit-removing portion which removes deposits accumulated on the inner wall surface 15 of the fluid passage 12. Specifically, when an ignition switch is turned off, the control portion 10 repeatedly rotates the valve body 4 between the full-open position and a specified rotation position over the full-close position by a specified angle. FIG. 9A shows a situation in which the valve body 4 is positioned at the full-close position and deposits are accumulated on the inner wall surface 15. FIG. 9B shows a situation in which the valve body 4 is rotated between the full-open position and a specified rotation position over the full-close position by the specified angle. FIG. 9C shows a situation in which the deposits are removed.

Figure 10:
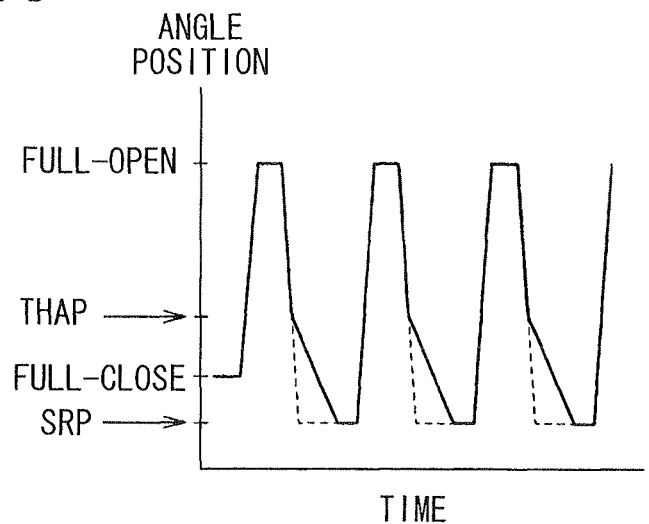
FIG. 10 is a time chart showing a variation in valve angle position during a deposit removing process, according to the fourth embodiment.

When the valve body 4 is positioned between a specified threshold angle position (THAP) and the specified rotation position (SRP) over the full-close position, the control portion 10 controls the electric motor 6 so that the rotating speed of the valve body 4 is lower than that in the valve-open mode, as shown in FIG. 10. That is, the duty ratio applied to the electric motor 6 is made smaller.

Even when the valve body 4 is rotated over the full-close position to remove the deposits, an abrasion between the seal ring 5 and the inner wall surface 15 can be restricted.

[Modification]

In the third embodiment, when the protrusion 34 is engaged with the stopper 33, the rotational position of the valve body 4 is not limited to the full-close position. As long as the angle sensor 11 can detect it, any rotational position of the valve body 4 can be accepted.

Figure 11A:
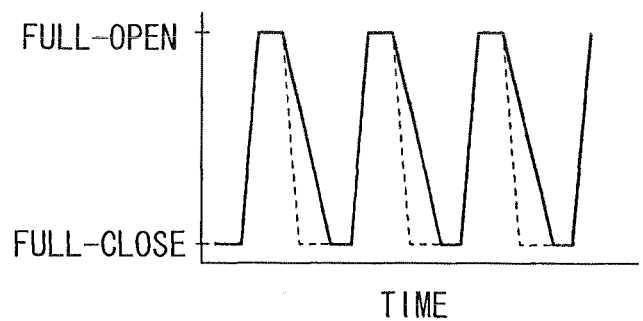
FIGS. 11A and 11B are time charts showing a variation in valve angle position according to modifications of the fourth embodiment.
Figure 11B:
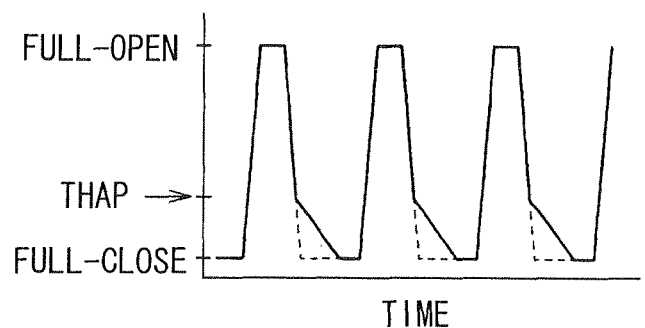

In the fourth embodiment, in order to remove the deposits, the valve body 4 may be repeatedly rotated between the full-close position and the full-open position. In this case, as shown in FIG. 11A, the rotating speed of the valve body 4 in the valve-close mode may be set lower than that in the valve-open mode. Alternatively, as shown in FIG. 11B, when the valve body is positioned between the threshold angle position (THAP) and the full-close position, the rotating speed of the valve body 4 may be set lower than that in the valve-open mode.

Figure 12:
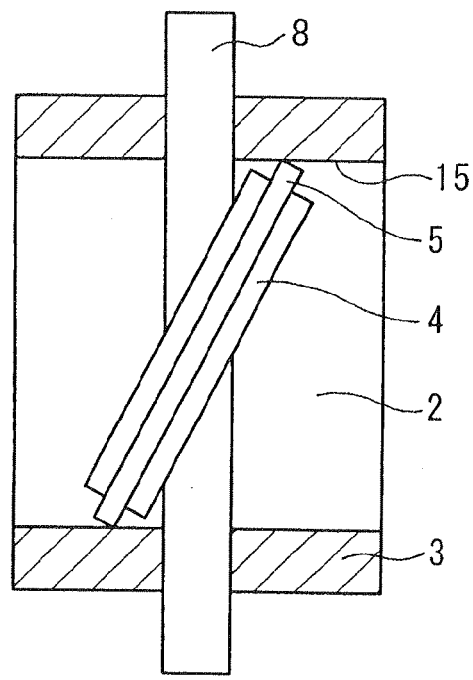
FIG. 12 is a cross sectional view showing a butterfly valve body according to a modification.

In the above embodiments, the shaft 8 is connected to one surface of the valve body 4. As shown in FIG. 12, the shaft 8 is connected to the valve body 4 in such a manner as to penetrate the valve body 4.

Figure 13:
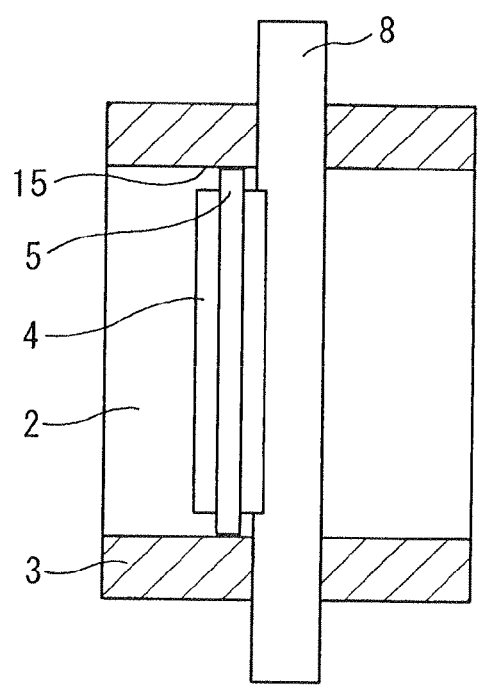
FIG. 13 is a cross sectional view showing an offset valve body according to another modification.
Figure 14A:
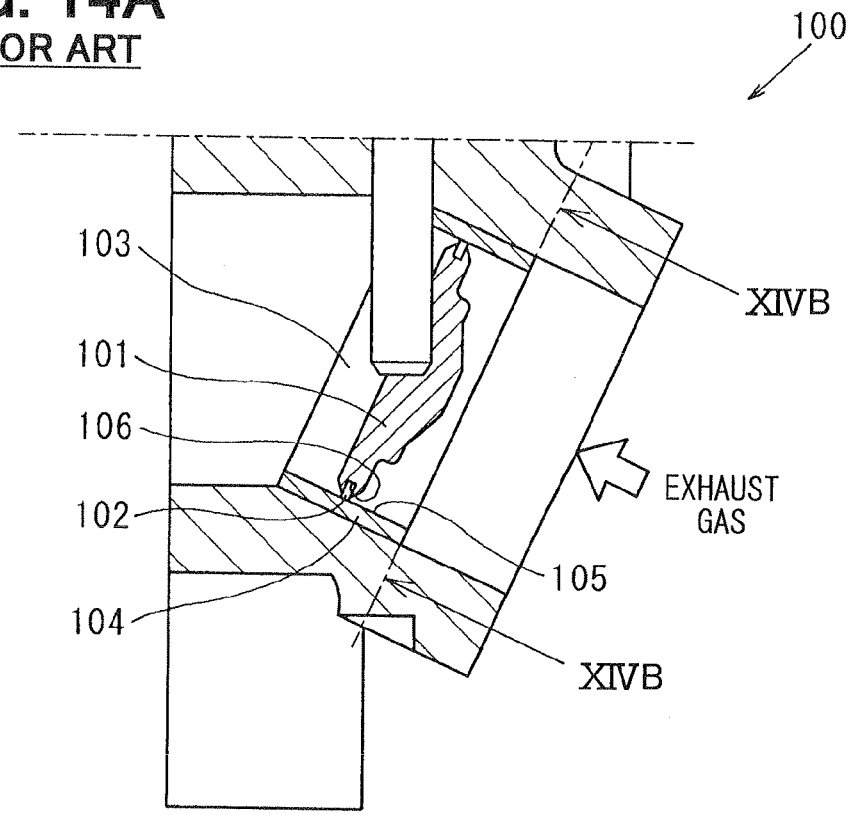
FIG. 14A is a cross sectional view showing an essential portion of a conventional valve apparatus.
Figure 14B:
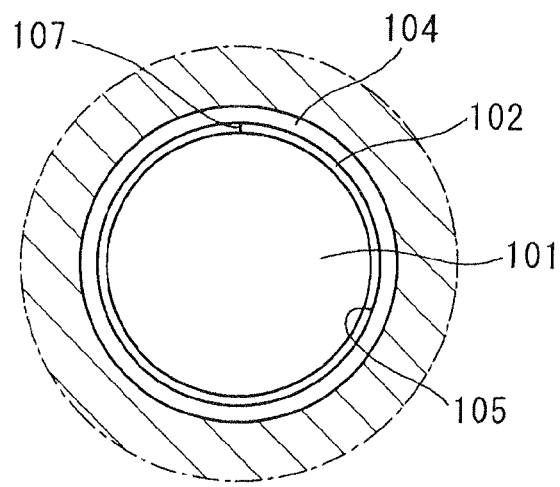
FIG. 14B is a cross sectional view taken along a line XIVB-XIVB of FIG. 14A.
Figure 15A:
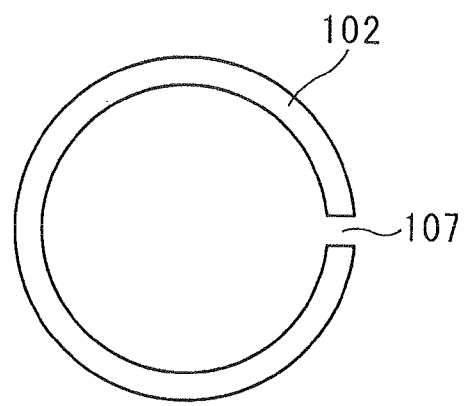
FIG. 15A is a plan view of a conventional seal ring.
Figure 15B:
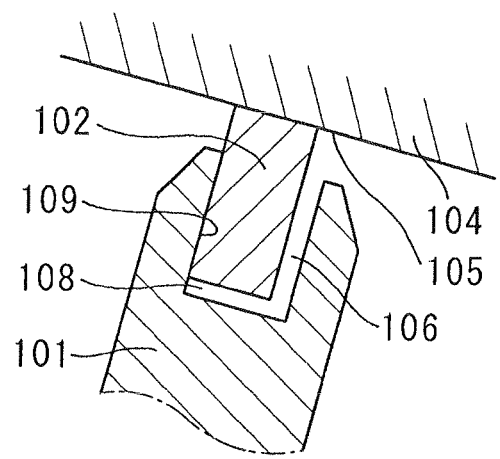
FIG. 15B is an enlarged view showing a contacting portion between a seal ring and an inner wall surface in a conventional valve apparatus.

Alternatively, as shown in FIG. 13, the shaft 8 may be connected to the valve body 4 in such a manner that an axis of the shaft 8 extends in parallel with a flat surface of the valve body 4.

In the above embodiments, the valve apparatus 1 is employed as an EGR valve apparatus. The valve apparatus 1 can be applied to other system. While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A valve apparatus comprising:
    a disc-shaped valve body rotatably accommodated in a fluid passage for adjusting a flow passage area of the fluid passage;
    a seal ring received in an annular groove formed on an outer periphery of the valve body, the seal ring being annularly brought into contact with an inner wall surface of the fluid passage to seal a clearance gap between the outer periphery of the valve body and the inner wall surface when the valve body is positioned at a full-close position;

a control portion controlling an energization of an electric motor which supplies a rotational torque to the valve body so that a position of the valve body is controlled, and an angle sensor detecting an angle position of the valve body and transmitting the detected angle position to the control portion, wherein the seal ring is a C-shaped ring having both ends circumferentially confronting each other to form an arc clearance therebetween, the seal ring is elastically deformed in such a manner that the seal ring is in contact with the inner wall surface with the arc clearance most shrunk when the valve body is positioned at the full-close position, while the valve body is rotated from the full-close position toward the full-open position, the seal ring keeps the sealing of the clearance gap between the valve body and the inner wall surface until the valve body is positioned at a first boundary angle position from which the seal ring unseals the clearance gap, when the valve body is further rotated from the first boundary angle position toward the full-open position, the seal ring reaches a second boundary angle position at which the seal ring has no tension in the annular groove, the control portion controls the energization of the electric motor in such a manner that the valve body is rotated toward a full-close position in a valve-close mode and the valve body is rotated toward a full-open position in a valve-open mode, the control portion defines a threshold angle position by adding a specified angle width to a predetermined angle position of between the first boundary angle position and the second boundary angle position, when the valve body is positioned between the threshold angle position and the full-close position in the valve-close mode, the control portion controls the energization of the electric motor in such a manner that a rotating speed of the valve body is lower than that in the valve-open mode, and the specified angle width is established based on a variation in stop-position of the valve body, a detection error of the angle sensor due to its temperature characteristic and an analog-digital converting error of the control portion.

2. A valve apparatus according to claim 1, wherein
the control portion has a deposit removing means for removing deposits accumulated on the inner wall surface, and
the deposit removing means controls the energization of the electric motor in such a manner that a rotating speed of the valve body is lower than that in the valve-open mode in a range where the valve body is rotated between the full-open position and a specified rotation position over the full-close position by a specified angle.

3. A valve apparatus comprising:
a disc-shaped valve body rotatably accommodated in a fluid passage for adjusting a flow passage area of the fluid passage;
a seal ring received in an annular groove formed on an outer periphery of the valve body, the seal ring being annularly brought into contact with an inner wall surface of the fluid passage to seal a clearance gap between the outer periphery of the valve body and the inner wall surface when the valve body is positioned at a full-close position;
a control portion controlling an energization of an electric motor which supplies a rotational torque to the valve body so that a position of the valve body is controlled,
an angle sensor detecting an angle position of the valve body and transmitting the detected angle position to the control portion,
a reduction gear mechanism which reduces and transmits a rotational torque from an output shaft of the electric motor to a shaft of the valve body; and
a stopper capable of engaging a gear portion of the reduction gear mechanism in order to restrict that the valve body is rotated in a valve-close direction over a predetermined angle position,
wherein
the control portion controls the energization of the electric motor in such a manner that the valve body is rotated toward a full-close position in a valve-close mode and the valve body is rotated toward a full-open position in a valve-open mode,
the control portion defines a threshold angle position by adding a specified angle width to a predetermined angle position of between the first boundary angle position and the second boundary angle position,
when the valve body is positioned between the threshold angle position and the full-close position in the valve-close mode, the control portion controls the energization of the electric motor in such a manner that a rotating speed of the valve body is lower than that in the valve-open mode, and
the specified angle width is established based on a variation in stop-position of the valve body, a detection error of the angle sensor and an analog-digital converting error of the control portion.

4. A valve apparatus according to claim 3, wherein
the predetermined angle position corresponds to the full-close position.

* * * * *